United States Patent [19]

Pietzsch et al.

[11] Patent Number: 4,876,600

[45] Date of Patent: Oct. 24, 1989

[54] METHOD AND DEVICE FOR REPRESENTING A COMPOSITE IMAGE ON A SCREEN OF A SCREEN DEVICE

[75] Inventors: Ludwig Pietzsch, Karlsruhe; Detlef Senger, Ettlingen; Horst Winter, Karlsruhe; Hubert Völlinger, Steinmauern, all of Fed. Rep. of Germany

[73] Assignee: IBP Pietzsch Gmbh, Ettlingen, Fed. Rep. of Germany

[21] Appl. No.: 148,755

[22] Filed: Jan. 26, 1988

[30] Foreign Application Priority Data

Jan. 26, 1987 [DE] Fed. Rep. of Germany ....... 3702220

[51] Int. Cl.[4] ........................ H04N 5/262; H04N 9/74

[52] U.S. Cl. .................................... 358/183; 358/182; 358/22; 340/721

[58] Field of Search ................. 358/183, 182, 186, 22, 358/87; 340/721

[56] References Cited

U.S. PATENT DOCUMENTS

| | | | |
|---|---|---|---|
| 4,266,242 | 5/1981 | McCoy | 358/183 |
| 4,267,562 | 5/1981 | Raimondi | 358/109 |
| 4,317,114 | 2/1982 | Walker | 340/721 |
| 4,581,762 | 4/1986 | Lapidus et al. | 358/107 |
| 4,599,611 | 7/1986 | Bowker et al. | 358/183 |
| 4,729,028 | 3/1988 | Micie et al. | 358/22 |
| 4,745,479 | 5/1988 | Washner | 358/183 |
| 4,752,773 | 6/1988 | Togawa et al. | 340/721 |

*Primary Examiner*—John K. Peng
*Attorney, Agent, or Firm*—L. Lawton Rogers, III; Joseph M. Killeen

[57] ABSTRACT

A method for representing a composite image on a screen of a screen device, the image being composed of a plurality of natural and/or synthetic sub-images generated by diferent sources, is characterized in that the sub-images are composed of a line-by-line representation on the screen by (a) reading out at video rate a pluralaity of pixels, the number of which corresponds to that of the respective sub-image from said storages line by line and (b) repeating step (a) line by line. Furthermore, there is set forth a device for carrying out the method according to the invention.

16 Claims, 2 Drawing Sheets

METHOD AND DEVICE FOR REPRESENTING A COMPOSITE IMAGE ON A SCREEN OF A SCREEN DEVICE

BACKGROUND OF THE INVENTION

The present invention relates to a method and a device for representing a composite image on a screen of a screen device, said image being composed of a plurality of natural and/or synthetic sub-images which are generated by different sources.

The representation of an image on the screen of a screen device is provided by a plurality of lines, e.g., 625 lines, which are scanned by an electron beam. When the electron beam has scanned all the lines of the screen, the entire process is repeated. In order to scan the lines in a regular manner, the electron beam must be synchronized in the horizontal and the vertical direction. The electron beam is clocked from one line to the following line by the clock for the horizontal synchronization, the so-called line clock, while said beam returns to the starting point of the image at the clock for the vertical synchronization, the so-called image clock, to again scan line after line of the screen.

Screen devices for representation of characters and graphics in addition comprise, contrary to common TV-devices, a further clock besides the line clock and the image clock. At the clock, the so-called dot clock or pixel clock, each line is split up into a plurality of pixels. The electron beam in this case continuously moves along the line such as in common TV-devices, but its black-white control is clocked by the pixel clock whereby the resolution of the pixels is determined by the period of the pixel clock.

This common principle can be used to fade in determined points of the screen color- or image-halftones not provided by the associated image source, e.g., a TV-camera. Methods for fading graphical elements in the image of a screen device are already known (DE-OS 34 10 662). Furthermore, techniques such as "image in image" an analogue studio technique or "window technique" in screen edited computer working places using totally synthetic raster images are known in the art (German Pat. No. 30 35 636).

In a display apparatus having a color graphic display it is known to make use of three (blue, red and green) bit map memory planes and to perform logic operations within the respective memory planes for extracting or suppressing a specific color (U.S. Pat. No. 4,613,852, granted to Kinya Maruko on Sept. 23, 1986).

It is an object of the invention to provide a method and a device of the mentioned kind providing an improved composite image representation on a screen of at least two sub-images generated by different sources.

The method and the device according to the invention provide a representation of images particularly on high resolution screens, which images may be composed of sub-images from different sources by keeping up with the pixel frequency of several 10 MHz, from pixel to pixel, from line to line and from sub-image to sub-image. The picture sources may be driven asynchronously and with different image generating frequencies.

Other objects and advantages of the invention are mentioned and explained in detail in the following description when taken together with the accompanying drawing.

THE DRAWINGS

DESCRIPTION OF PREFERRED EMBODIMENTS

Figure 1:
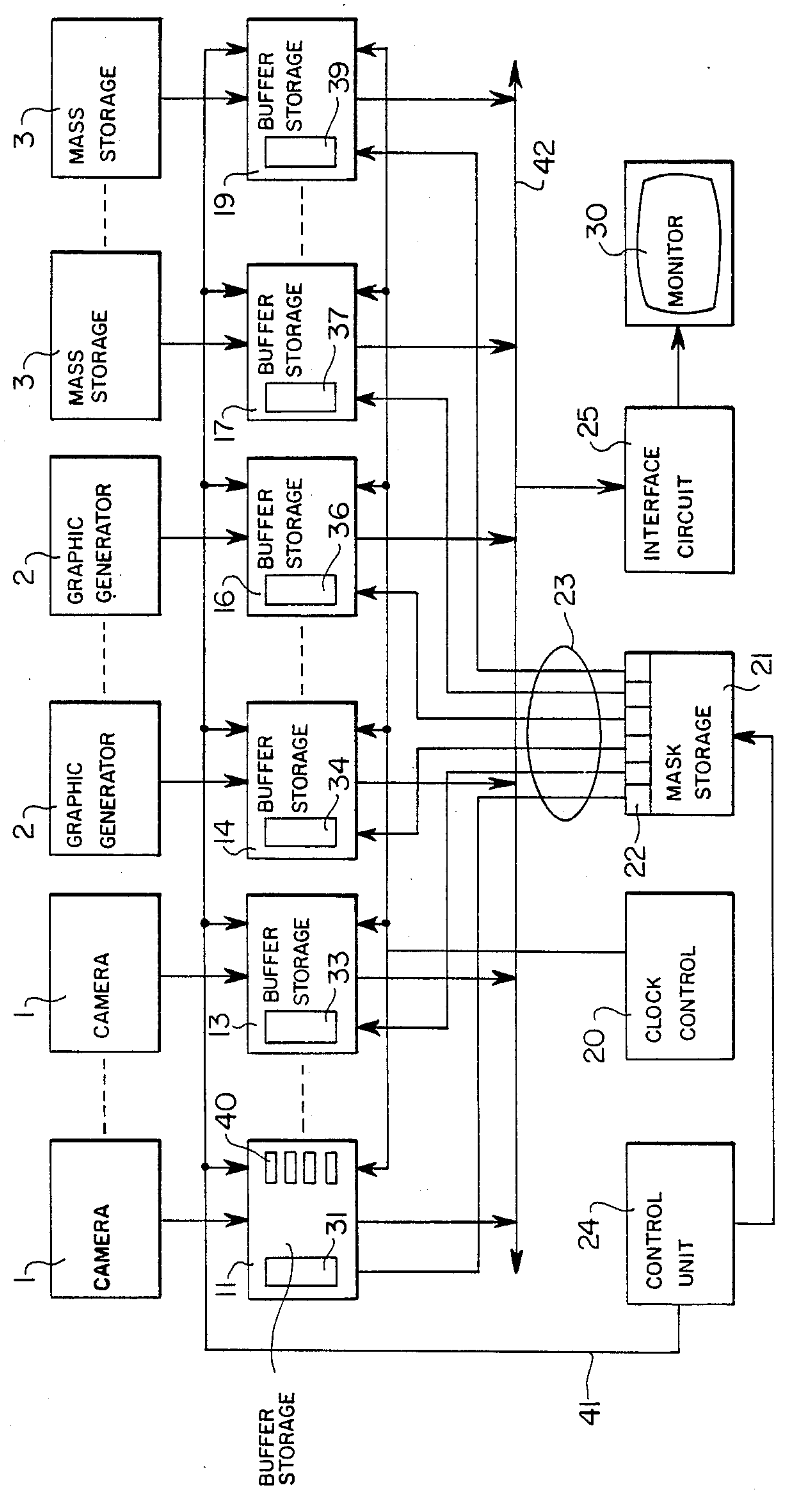
FIG. 1 is a block diagram of an embodiment of the imaging device of the present invention.

Referring to FIG. 1 there is shown a device comprising "sources" for generating images said sources being constituted by three TV-cameras 1, raster graphic generators 2, and mass storages 3 for digital image data, to each of which buffer storages 11 to 13, 14 to 16 and 17 to 19 are associated. The TV-cameras 1, raster-graphic generators 2 and mass storages 3 transmit their respective information asynchronously and thereby independent from each other to one of the buffer storages 11 to 19, respectively, which buffer storages are capable of being written in and read out via different inputs and outputs ("Dual-Port"). While writing-in can be performed with different data rates, reading the data and transmitting same to an interface circuit 25 for a screen or a monitor 30 on which the image information are to be represented is synchronized by a central clock control device 20. The clock rate must at least correspond to the video frequency. In case of high resolution screens said clock rate must be several times higher than the video frequency to generate an image without flickering.

The buffer storages 11 to 19, which normally contain images or sub-images, are not read out one after another or in a fixed scheme and repesented on the monitor 30, but the image of the monitor can principally be composed of different sources 1 and/or 2 and/or 3 pixel by pixel. To that end there is provided a mask storage 21 which may be loaded or written-in by means of a control unit 24, the content of said mask storage 21 being applied to a control circuit 23 at pixel frequency. The control circuit 23 associates each bit of a mask storage output register 22 to a control element 31 to 39 of the buffer storages 11 to 19 of the respective sources 1, 2, 3. If the mask storage 21 is constructed such that the data width (data word), which may be read in parallel, corresponds exactly to the number of sources and if the mask storage 21 is charged such that one bit is set per each data word, a selection can be performed of that pixel to be represented from the pixel of any of the sources 1, 2, 3.

When a plurality of pixels one after another and a plurality of lines or line fractions one under the other are being fed by the same source, sub-images are provided.

If control of the buffer storages is provided with four chargeable registers or counters 40, additionally, sub-imagesof very different sizes can be used as a source and can be inserted at any location of the screen, because the starting location of the subimage (left upper corner) can be determined with respect to the entire image by appropriately preloading the counter 40. To this end one of the counters provides for a line shift, a second counter provides for moving the pixel within the line and the remaining counters count up to a line and/or up to the last line of the sub-image, respectively.

The counters 40 are preset by bus 41 according to the image size and the desired position relative to the entire image.

Finally, the control information preset by the mask storage 21 causes the buffer storages 11 to 19 to transmit the image half tone or the color of the pixel to be represented from the selected sorce through the bus 42 to the interface circuit 25.

Thus, pixel by pixel, the half tones or colors are transmitted to the interface circuit 25 as they are needed for the representation. The size of the entire image with respect to the size of the sub-image, and the manner in which the sub-image or parts thereof are composed, are irrelevant for the arrangement.

Figure 2:
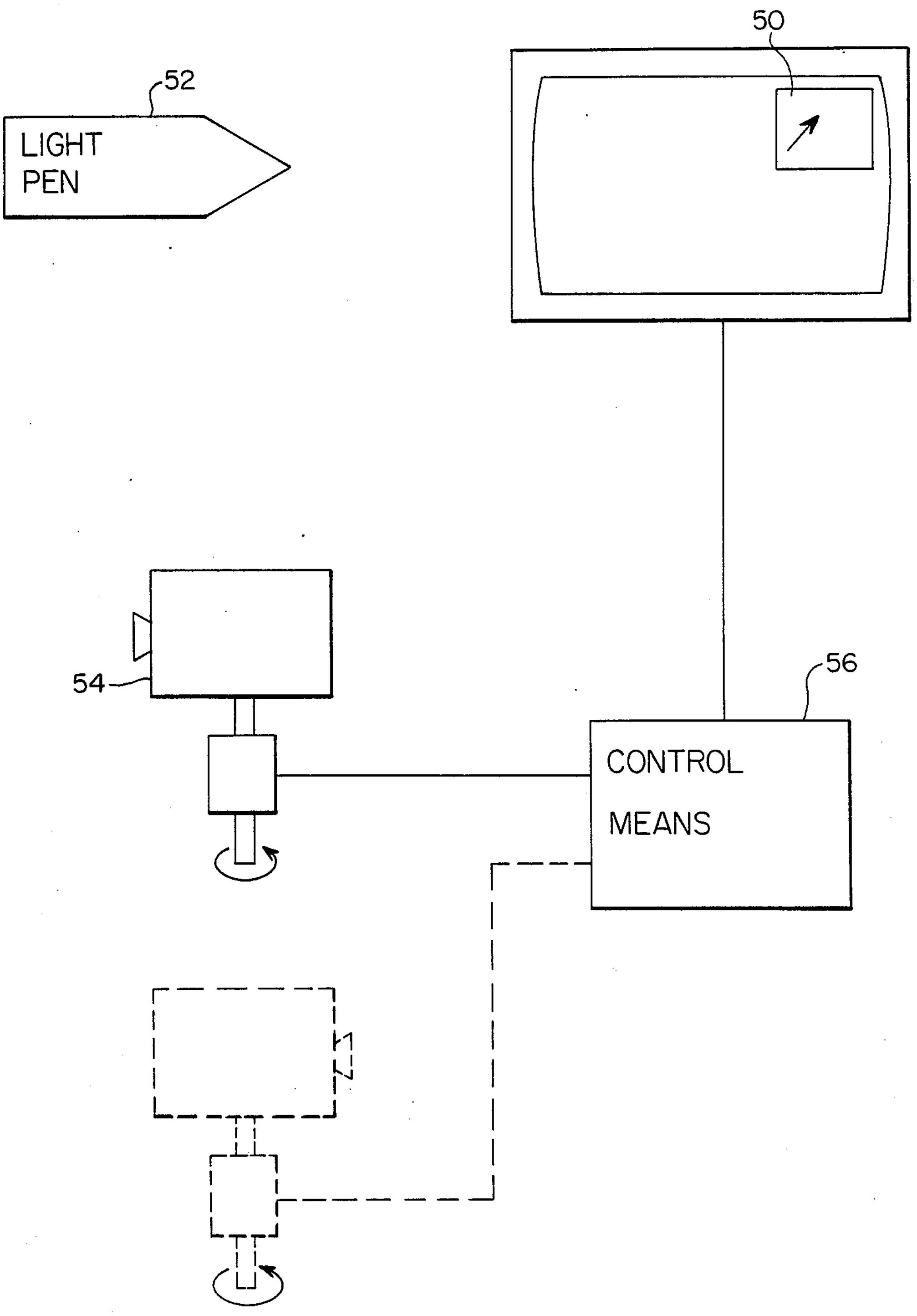
FIG. 2 is a partial block and partial schematic diagram of the screen and camera control means of an embodiment of the imaging device of the present invention.

By the described device for example, text may be faded in at any place of the screen in both "empty space" or already generated sub-images. In another application wherein the sources are constituted by different TV-cameras, which are installed at different locations and/or with different orientations, a "panorama image" may be represented on the screen by arranging the sub-images side by side. As seen in FIG. 2, independent therefrom or in addition thereto a respective map-cutout may be faded in the entire representation in which map-cutout the orientation of the TV-camera is representable by an arrow 50 or the like. By marking of a desired direction on the represented map-cutout by means of a light pen 52, by touching or the like, the camera 54 is rotatably adjustable with camera control means 56 to aim in said direction.

While the present invention has been described in connection with a preferred embodiment, many modifications will be readily apparent to one skilled in the art. The invention is therefore to be limited only by the claims when given a broad range of equivalents.

We claim:

1. A device for representing a composite image on a screen of a screen device, said image being composed of a plurality of natural and/or synthetic sub-images which are generated by different sources, comprising:

a storage associated to each of said sources, each said storage having a control element;

a mask storage for storing data words which receives directions for composing said sub-images from a control unit and having an output register, wherein the width of data in said data words, which may be read parallelly of, conforms to the number of said sources and one bit is set per each said data word; and a control circuit into which the content of the mask storage is written at pixel frequency, the output register of said mask storage being connected to the control element of each said storage.

2. The device of claim 1, wherein said sources comprise a plurality of cameras oriented in different viewing angles; and wherein the sub-images of said sources are arranged at any predetermined location of said screen to provide a composite image which is larger than the natural one.

3. The device of claim 1, wherein the sources comprise TV-cameras and/or rster graphic generators and/or mask storages containing digital image data.

4. The device of claim 3, wherein the screen is arranged to reproduce a number of pixels, which number is larger than the number of pixels which may be provided by each source.

5. The device of claim 3, wherein said sources comprise a plurality of cameras oriented in different viewing angles; and wherein the sub-images of said sources are arranged at any predetermined location of said screen to provide a composite image which is larger than the natural one.

6. The device of claim 1, wherein the composite image is composed of at least one representation of a scene taken by a camera and at least one representation of a map; and wherein a symbol is faded into the map representation to represent the orientation of the camera.

7. The device of claim 6, including means for controlling the orientation of said camera in response to a mark of the orientation on the map representation.

8. The device of claim 7, wherein said means is provided for marking the orientation is a light pen.

9. The device of claim 7, wherein a touch sensitive screen on which the marking of the orientation may be performed by touching.

10. The device of claim 1, wherein the screen is arranged to reproduce a number of pixels, which number is larger than the number of pixels which may be provided by each source.

11. The device of claim 10, wherein said sources comprise a plurality of cameras oriented in different viewing angles; and wherein the sub-images of said sources are arranged at any predetermined location of said screen to provide a composite image which is larger than the natural one.

12. The device of claim 10, wherein said sources comprise a plurality of cameras oriented in different viewing angles; and wherein the sub-images of said sources are arranged at any predetermined location of said screen to provide a composite image which is larger than the natural one.

13. The device of claim 10, wherein the composite image is composed of at least one representation of a scene taken by a camera and at least one representation of a map; and wherein a symbol is faded into the map representation to represent the orientation of the camera.

14. The device of claim 13, including means for controlling the orientation of said camera in response to a symbol of the orientation on the map representation.

15. The device of claim 14, wherein said means for marking the oreintation is a light pen.

16. The device of claim 14, including a touch sensitive screen on which the marking of the orintation may be performed by touching.

* * * * *